US012762380B2

(12) United States Patent
Li et al.

(10) Patent No.: US 12,762,380 B2
(45) Date of Patent: Oct. 13, 2026

(54) ADAPTIVE PREDICTION ENSEMBLE FOR MOTION FORECASTING

(71) Applicant: Honda Motor Co., Ltd., Tokyo (JP)

(72) Inventors: Jinning Li, Mountain View, CA (US); Jiachen Li, Mountain View, CA (US); Sangjae Bae, San Jose, CA (US); David Isele, Sunnyvale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 54 days.

(21) Appl. No.: 18/971,695

(22) Filed: Dec. 6, 2024

(65) Prior Publication Data

US 2026/0004106 A1 Jan. 1, 2026

Related U.S. Application Data

(60) Provisional application No. 63/666,387, filed on Jul. 1, 2024.

(51) Int. Cl.
*G06N 3/0455* (2023.01)
*G01C 21/28* (2006.01)
*G06N 3/08* (2023.01)

(52) U.S. Cl.
CPC ........... *G06N 3/0455* (2023.01); *G01C 21/28* (2013.01); *G06N 3/08* (2013.01)

(58) Field of Classification Search
CPC ........ G06N 3/0455; G06N 3/08; G01C 21/28; G01C 21/3407
See application file for complete search history.

(56) References Cited

U.S. PATENT DOCUMENTS

| | | | |
|---|---|---|---|
| 10,579,063 | B2 | 3/2020 | Haynes et al. |
| 10,733,510 | B2 | 8/2020 | Nageshrao et al. |
| 11,150,663 | B2 | 10/2021 | Shirvani et al. |

(Continued)

OTHER PUBLICATIONS

Shi, Shaoshuai, et al. "Motion transformer with global intention localization and local movement refinement." Advances in Neural Information Processing Systems 35 (2022): 6531-6543. (Year: 2022).*

(Continued)

*Primary Examiner* — Alan D Hutchinson
(74) *Attorney, Agent, or Firm* — Aaron Fong; American Honda Motor Co., Inc.

(57) ABSTRACT

A system and a method for motion forecasting are provided. The system acquires input data including road map images and historical trajectory information of a set of agents and transforms the input data into a vectorized representation. The system generates a first candidate trajectory prediction for the set of agents by application of a motion prediction neural network on the vectorized representation. The system further generates a second candidate trajectory prediction for the set of agents by application of a rule-based prediction model on the acquired input data. The system trains the motion prediction neural network based on the first candidate trajectory prediction and a set of ground truth trajectories of the set of agents. The system generates ranking results for the first candidate trajectory prediction and the second candidate trajectory prediction based on a routing function network and trains the routing function network based on the ranking results.

20 Claims, 6 Drawing Sheets

(56) References Cited

U.S. PATENT DOCUMENTS

| | | | | |
|---|---|---|---|---|
| 11,440,564 | B2 | 9/2022 | Narang et al. | |
| 11,493,926 | B2 | 11/2022 | He et al. | |
| 11,550,327 | B2 | 1/2023 | Gu | |
| 11,586,214 | B2 | 2/2023 | Narang et al. | |
| 11,702,105 | B2 | 7/2023 | Alvarez et al. | |
| 11,745,758 | B2 | 9/2023 | Narang et al. | |
| 11,971,722 | B2 | 4/2024 | You | |
| 12,024,194 | B2 | 7/2024 | Yasui | |
| 2019/0392308 | A1 | 12/2019 | Bhatnagar | |
| 2021/0150350 | A1* | 5/2021 | Gao .................. | B60W 60/0027 |

OTHER PUBLICATIONS

Salzmann, et al., "Trajectron++: Dynamically-Feasible Trajectory Forecasting With Heterogeneous Data", ECCV 2020: 16th European Conference, Jan. 13, 2021, 23 pages.
Shi, et al., "Motion Transformer with Global Intention Localization and Local Movement Refinement", 36th Conference on Neural Information Processing Systems (NeurIPS 2022), Mar. 18, 2023, 19 pages.
Li, et el., "Spatio-Temporal Graph Dual-Attention Network for Multi-Agent Prediction and Tracking", IEEE Transactions on Intelligent Transportation Systems, vol. 23, No. 8, 2021, 14 pages.
Li, et al., "EvolveGraph: Multi-Agent Trajectory Prediction with Dynamic Relational Reasoning", 34th Conference on Neural Information Processing Systems, 2020, 18 pages.
Jacobs, et al., "Adaptive Mixtures of Local Experts", Neural computation, vol. 3, 1991, pp. 79-87.
Sanseviero, et al., "Mixture of experts explained", Dec. 11, 2023, 25 pages.
Shazeer, et al., "Outrageously large neural networks: The sparsely-gated mixture-of-experts layer", Machine Learning, Jan. 23, 2017, 19 pages.
Shen, et al., "Mixture-of-Experts Meets Instruction Tuning: A Winning Combination for Large Language Models", arXiv, Jul. 5, 2023, 24 pages.
Gale, et al., "Megablocks: Efficient Sparse Training With Mixture-of-Experts", Proceedings of Machine Learning and Systems, vol. 5, Nov. 29, 2022, 13 pages.
He, et al., "FasterMoE: Modeling and Optimizing Training of Large-Scale Dynamic Pre-Trained Models", Apr. 2-6, 2022, pp. 120-134.
Zhang, et al., "Exact feature distribution matching for arbitrary style transfer and domain generalization", Proceedings of the IEEE/CVF conference on computer vision and pattern recognition, 2022, 11 pages.
Ma, et al., "Multi-Agent Driving Behavior Prediction across Different Scenarios with Self-Supervised Domain Knowledge", IEEE Intelligent Transportation Systems Conference (ITSC), Sep. 19-21, 2021, pp. 3122-3129.
Hu, et al., "Causal-based Time Series Domain Generalization for Vehicle Intention Prediction", International Conference on Robotics and Automation (ICRA), Dec. 3, 2021, 16 pages.
Li, et al., "Pedestrian Crossing Action Recognition and Trajectory Prediction with 3D Human Keypoints", IEEE International Conference on Robotics and Automation (ICRA), Jun. 1, 2023, 8 pages.
Wu, et al., "Collaborative Optimization and Aggregation for Decentralized Domain Generalization and Adaptation", Proceedings of the IEEE/CVF International Conference on Computer Vision, 2021, pp. 6484-6493.
Dubey, et al., "Adaptive Methods for Real-World Domain Generalization", Proceedings of the IEEE/CVF Conference on Computer Vision and Pattern Recognition, Mar. 30, 2021, 16 pages.
Chen, et al., "Compound Domain Generalization via Meta-Knowledge Encoding", Proceedings of the IEEE/CVF conference on computer vision and pattern recognition, Mar. 24, 2022, 11 pages.
Ettinger, et al., "Large Scale Interactive Motion Forecasting for Autonomous Driving : The Waymo Open Motion Dataset", Proceedings of the IEEE/CVF International Conference on Computer Vision, Apr. 20, 2021, 15 pages.
Chang, et al., "Argoverse: 3D Tracking and Forecasting with Rich Maps", Proceedings of the IEEE/CVF conference on computer vision and pattern recognition, Nov. 6, 2019, 18 pages.
Hu, et al., "Planning-oriented Autonomous Driving", Proceedings of the IEEE/CVF Conference on Computer Vision and Pattern Recognition, Mar. 23, 2023, 24 pages.
Li, et al., "Hierarchical Planning Through Goal-Conditioned Offline Reinforcement Learning", IEEE Robotics and Automation Letters, vol. 7, No. 4, May 24, 2022, 8 pages.
Song, et al., "PIP: Planning-informed Trajectory Prediction for Autonomous Driving", 16th European Conference, 2020, 16 pages.
Li, et al., "Interaction-Aware Behavior Planning for Autonomous Vehicles Validated with Real Traffic Data", Dynamic Systems and Control Conference, vol. 84287, Jan. 15, 2021, 8 pages.
Li, et al., "Interactive Autonomous Navigation with Internal State Inference and Interactivity Estimation", IEEE Transactions on Robotics, Nov. 27, 2023, 18 pages.
Lange, et al., "Scene Informer: Anchor-based Occlusion Inference and Trajectory Prediction in Partially Observable Environments", Mar. 9, 2024, 8 pages.
Huang, et al., "Differentiable Integrated Motion Prediction and Planning with Learnable Cost Function for Autonomous Driving", IEEE transactions on neural networks and learning systems, Feb. 18, 2023, 15 pages.
Shao, et al., "Failure Detection for Motion Prediction of Autonomous Driving: An Uncertainty Perspective", IEEE International Conference on Robotics and Automation, 2023, 8 pages.
Eltouny, et al., "DE-TGN: Uncertainty-Aware Human Motion Forecasting using Deep Ensembles", IEEE Robotics and Automation Letters, 2024, 8 pages.
Li, et al., "Dealing with the Unknown: Pessimistic Offline Reinforcement Learning", Conference on Robot Learning, Nov. 9, 2021, 18 pages.
Wang, et al., "CMP: Cooperative Motion Prediction with Multi-Agent Communication", arXiv, Oct. 3, 2024, 8 pages.
Lu, et al., "Quantifying Uncertainty in Motion Prediction with Variational Bayesian Mixture", Proceedings of the IEEE/CVF Conference on Computer Vision and Pattern Recognition, Apr. 4, 2024, 14 pages.
Ayhan, et al., "Test-time Data Augmentation for Estimation of Heteroscedastic Aleatoric Uncertainty in Deep Neural Networks", 1st Conference on Medical Imaging with Deep Learning, 2022, 9 pages.
Li, et al., "Guided Online Distillation: Promoting Safe Reinforcement Learning by Offline Demonstration", arXiv, Oct. 12, 2023, 7 pages.
Bai, et al., "Training a Helpful and Harmless Assistant with Reinforcement Learning from Human Feedback", arXiv, Apr. 12, 2022, 74 pages.
Rafailov, et al., "Direct Preference Optimization: Your Language Model is Secretly a Reward Model", 37th Conference on Neural Information Processing Systems, Jul. 29, 2024, 27 pages.
Gao, et al., "VectorNet: Encoding HD Maps and Agent Dynamics from Vectorized Representation", Proceedings of the IEEE/CVF Conference on Computer Vision and Pattern Recognition, May 8, 2020, 9 pages.
Qi, et al., "PointNet: Deep Learning on Point Sets for 3D Classification and Segmentation", Proceedings of the IEEE conference on computer vision and pattern recognition, Apr. 10, 2017, 19 pages.
Ouyang, et al., "Training language models to follow instructions with human feedback", Advances in neural information processing systems, vol. 35, Mar. 4, 2022, 68 pages.
Everingham, et al., "The PASCAL Visual Object Classes (VOC) Challenge", International journal of computer vision, vol. 88, Sep. 9, 2009, 37 pages.
Nayakanti, et al., "Wayformer: Motion Forecasting via Simple & Efficient Attention Networks", IEEE International Conference on Robotics and Automation (ICRA), Jul. 12, 2022, 20 pages.

(56) References Cited

OTHER PUBLICATIONS

Toyungyernsub, et al., "Dynamics-Aware Spatiotemporal Occupancy Prediction in Urban Environments", International Conference on Intelligent Robots and Systems, Sep. 27, 2022, 6 pages.
Isele, et al., "Gaussian Lane Keeping: A Robust Prediction Baseline", IEEE Intelligent Transportation Systems Conference (ITSC), Jul. 26, 2024, 8 pages.
Yao, et al., "SoNIC: Safe Social Navigation with Adaptive Conformal Inference and Constrained Reinforcement Learning", arXiv, Jul. 24, 2024, 8 pages.
Tobin, et al., "Domain Randomization for Transferring Deep Neural Networks from Simulation to the Real World", IEEE/RSJ international conference on intelligent robots and systems (IROS), Mar. 20, 2017, 8 pages.
Baek, et al., "Agreement-on-the-Line: Predicting the Performance of Neural Networks under Distribution Shift", 36th Conference on Neural Information Processing Systems, May 11, 2023, 32 pages.
Csordas, et al., "The Devil is in the Detail: Simple Tricks Improve Systematic Generalization of Transformers", arXiv, Feb. 14, 2022, 16 pages.
Zhou, et al., "Transformers Can Achieve Length Generalization But Not Robustly", arXiv, Feb. 14, 2024, 33 pages.
Isele, et al., "Selective Experience Replay for Lifelong Learning", Proceedings of the AAAI Conference on Artificial Intelligence, Feb. 28, 2018, 9 pages.
Kumar, et al., "Fine-Tuning can Distort Pretrained Features and Underperform Out-of-Distribution", arXiv, Feb. 21, 2022, 54 pages.
Feng, et al., "Unitraj: A unified framework for scalable vehicle trajectory prediction", European Computer Vision Conference, Aug. 7, 2024, 25 pages.

* cited by examiner

ADAPTIVE PREDICTION ENSEMBLE FOR MOTION FORECASTING

CROSS-REFERENCE TO RELATED APPLICATIONS/INCORPORATION BY REFERENCE

This application claims priority to U.S. Provisional Patent Application Ser. No. 63/666,387 filed on Jul. 1, 2024, the entire content of which is hereby incorporated herein by reference.

BACKGROUND

In autonomous or semi-autonomous vehicle systems, motion forecasting involves predicting the future locations or trajectories of different vehicles. Various existing prediction algorithms, which have demonstrated high accuracy with real-world traffic datasets, may be used for this purpose. However, most of these prediction algorithms perform best only in familiar scenarios. Typically, traffic conditions in various parts of the same area do not vary drastically, and human driving skills, including prediction and judgment, may not be significantly impacted by such variations or out-of-distribution (OOD) scenes. In contrast, when deep learning-based prediction algorithms are applied to OOD scenes without prior exposure (zero-shot manner), such as predicting vehicle trajectories from a dataset different from the training dataset, the performance of these deep learning-based prediction algorithms may drop significantly. In some cases, deep learning-based prediction algorithms may not even perform as well as simpler rule-based models. Therefore, there is a need for improved technology that can provide reliable results in any zero-shot OOD scenario.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, a system is provided. The system may include circuitry. The circuitry may acquire input data including road map images and historical trajectory information of a set of agents in the road map images. The circuitry may transform the input data into a vectorized representation. The circuitry may generate a first candidate trajectory prediction for the set of agents by application of a motion prediction neural network on the vectorized representation. The circuitry may generate a second candidate trajectory prediction for the set of agents by application of a rule-based prediction model on the acquired input data. The circuitry may train the motion prediction neural network based on the first candidate trajectory prediction and a set of ground truth trajectories of the set of agents. The circuitry may generate ranking results for the first candidate trajectory prediction and the second candidate trajectory prediction based on a routing function network. The circuitry may train the routing function network based on the ranking results.

According to another embodiment of the disclosure, a system is provided. The system may include circuitry. The circuitry may acquire input data including road map images and historical trajectory information of a set of agents in the road map images. The circuitry may transform the input data into a vectorized representation. The circuitry may generate a first candidate trajectory prediction for the set of agents by application of a motion prediction neural network on the vectorized representation. The circuitry may generate a second candidate trajectory prediction for the set of agents by application of a rule-based prediction model on the acquired input data. The circuitry may generate ranking results for the first candidate trajectory prediction and the second candidate trajectory prediction based on a routing function network. The circuitry may select a final trajectory prediction for the set of agents as one of the first candidate trajectory prediction and the second candidate trajectory prediction based on the ranking results.

According to yet another embodiment of the disclosure, a method in a system is provided. The method may include acquisition of input data including road map images and historical trajectory information of a set of agents in the road map images. The method may include generation of a vectorized representation based on the acquired input data and generation of a first candidate trajectory prediction for the set of agents by application of a motion prediction neural network on the vectorized representation. The method may further include generation of a second candidate trajectory prediction for the set of agents by application of a rule-based prediction model on the acquired input data. The method may include training of the motion prediction neural network based on the first candidate trajectory prediction and a set of ground truth trajectories for the set of agents. The method may further include generation of ranking results for the first candidate trajectory prediction and the second candidate trajectory prediction based on a routing function network and training of the routing function network based on the ranking results.

Figure 1:
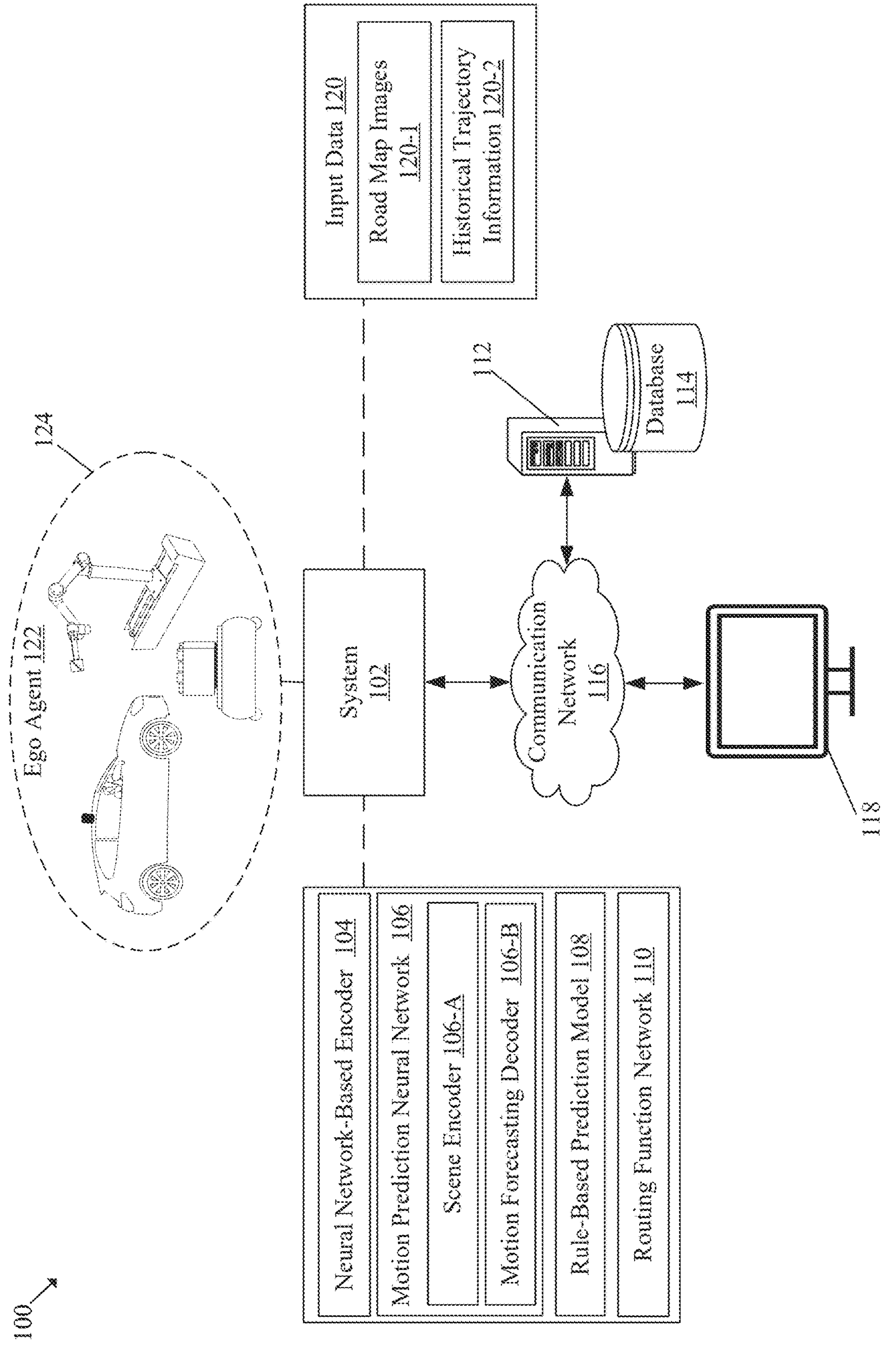
FIG. 1 is a block diagram that illustrates an exemplary network environment for motion forecasting via a system, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following implementation may be found in a system and method associated with adaptive prediction ensemble for motion forecasting. This system may include circuitry that acquires input data, such as road map images and historical trajectory information of agents in those images. The circuitry may transform this input data into a vectorized representation and generate a first candidate trajectory prediction using a motion prediction neural network. Additionally, the circuitry may generate a second candidate trajectory prediction using a rule-based prediction model. The motion prediction neural network may be trained based on the first candidate trajectory prediction and a set of ground truth trajectories. The circuitry may then rank the first and second candidate trajectory predictions using a routing function network, which may also be trained based on these ranking results.

The routing function network may be trained concurrently with the motion prediction neural network. The system may be designed to switch between the motion prediction neural network and the rule-based prediction model to produce a reliable final trajectory prediction. The routing function network may switch to the rule-based prediction model when the first candidate trajectory prediction is deemed unreliable. Once trained, the system may evaluate the motion prediction neural network and the routing function network on a dataset different from the training dataset. This may significantly improve the system's prediction performance in zero-shot scenarios. The system may then use these networks to generate reliable final trajectory predictions in real-time scenarios.

Various motion prediction models are typically integrated into vehicular systems to enhance Advanced Driver Assistance System (ADAS) features. These models may run successfully on many datasets and be integrated into the vehicular system's autonomy stack. However, these models may sometimes fail to provide reliable predictions, leading to erroneous downstream motion planning. Efforts have been made to detect prediction failures and leverage uncertainty estimation to determine prediction reliability. Techniques for estimating prediction uncertainty may include ensemble-dedicated uncertainty estimation model training, rule-based estimation, and data augmentation. However, training new models for uncertainty estimation and evaluating accuracy of such models may be challenging due to the lack of ground truth. Ensemble-based uncertainty estimation may be costly and may introduce too much variance, reducing the reliability of out-of-distribution detection. A mixture-of-experts technique may also be used for predictions. This technique may collect a set of experts specializing in different sub-tasks and select the most suitable expert during inference. However, deep learning-based predictors used in this technique may often perform poorly on cross-dataset generalization.

The system may provide an adaptive prediction ensemble for motion forecasting. The system may train the routing function network concurrently with various predictor experts associated with the motion prediction neural network. This may increase the routing function network's exposure to anomalous trajectory predictions on a normal training dataset, improving performance on zero-shot generalization tasks.

The system may follow the mixture-of-experts technique but may not train individual experts for specific sub-tasks. The system may include both deep learning-based and rule-based prediction neural networks for general motion prediction tasks. The routing function network may be trained in an automated pipeline, incorporating all trajectory predictions from the deep learning-based motion prediction neural network. This exposure to diverse trajectory prediction candidates may help the routing function network differentiate reliable predictions from unreliable ones, improving final trajectory prediction in zero-shot performance.

The adaptive prediction ensemble may improve the test-time performance of motion prediction algorithms in zero-shot generalization tasks and may consist of two stages: a) during training, the deep learning-based motion prediction neural network and the routing function network may be trained concurrently; and b) during testing, the rule-based prediction model may be incorporated, and the final prediction output may be adaptively selected by the routing function based on ranking results and quality.

Key advantages of the system may include enhanced safety, as the system may predict the movements of agents, pedestrians, and cyclists, aiding in safer driving decisions and reducing accident risks. The system may also improve efficiency in planning and robotics by optimizing movement and final trajectory prediction, leading to more efficient operations and reduced energy consumption. Additionally, the system may enhance the user experience in animation and gaming by creating more realistic and fluid character movements. By predicting future trajectories and movements, the system may enable proactive decision-making, which is crucial in dynamic environments requiring quick and accurate responses. Furthermore, in robotics and autonomous vehicles, the system may help avoid collisions by predicting the motion of agents and entities in the environment, ensuring smoother and safer operations.

Reference will now be made in detail to specific aspects or features, examples of which are illustrated in the accompanying drawings. Corresponding or similar reference numbers will be used throughout the drawings to refer to the same or corresponding parts.

FIG. 1 is a block diagram that illustrates an exemplary network environment utilizing adaptive prediction ensemble for motion forecasting, in accordance with an embodiment of the disclosure. With reference to FIG. 1, there is shown a network environment 100. The network environment 100 may include a system 102, a neural network-based encoder 104, a motion prediction neural network 106, a rule-based prediction model 108, a routing function network 110, a server 112, a database 114, and a user device 118. The system 102, the server 112, and the user device 118 may communicate with each other via a communication network 116.

Figure 4:
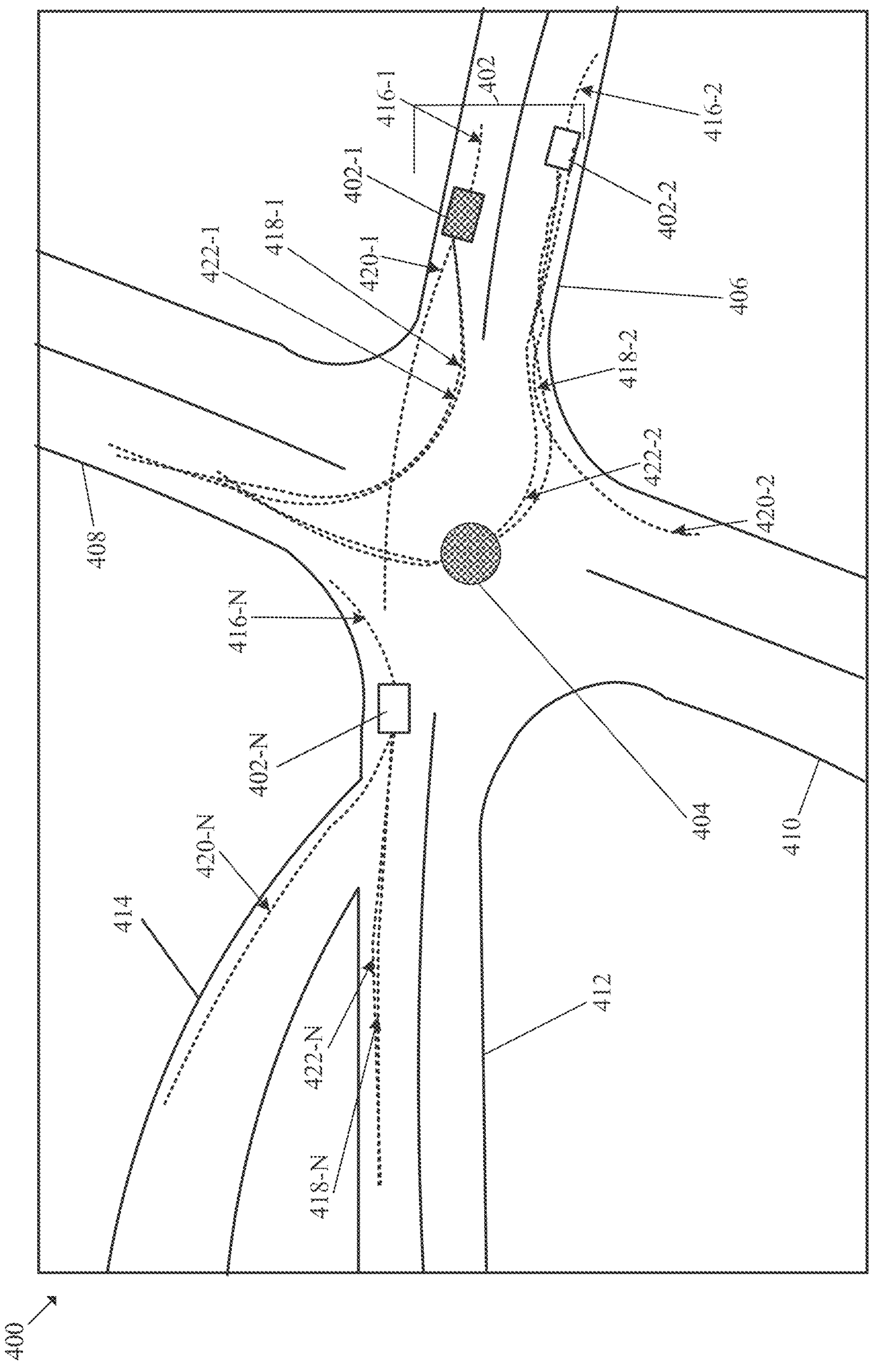
FIG. 4 is an exemplary diagram that illustrates a multi-agent environment, in accordance with an embodiment of the disclosure.

In an embodiment, the system 102 may be implemented on a vehicle or a robotic system, which may be referred to as an ego agent 122. The ego agent 122 may be an autonomous or semi-autonomous agent, with a sensor system capable of perceiving a surrounding environment 124 populated by multiple agents, making driving decisions, and navigating the environment. The ego agent 122 may include a sensor module (not shown) including various sensors (like cameras, LiDAR, radar) of the sensor system to acquire data associated with the surrounding environment 124, including type of track, obstacles like signboard and divider, and positions and movements of other agents (such as pedestrians, other vehicles, and obstacles) of a set of agents 402 (as shown in FIG. 4). The acquired data may be then processed to make real-time decisions about path planning, obstacle avoidance, and other driving tasks to ensure safe and efficient operation.

As used herein, the term "ego agent" may refer specifically to the vehicle itself within the multiagent environment (i.e., the surrounding environment 124). The ego agent 122 may be the primary entity that navigates using sensors, algorithms, and decision-making processes to achieve objectives, such as reaching a destination safely and efficiently. Unlike other agents, which may include other vehicles, pedestrians, and cyclists, the ego agent is the focal point of a navigation system, continuously monitoring and predicting the actions of surrounding agents to make informed decisions. The ego agent 122 must account for both dynamic agents, like moving vehicles and pedestrians, and static objects, like parked cars and barriers, to ensure safe and efficient travel.

As used herein, the term "agents" may refer to any entity within the surrounding environment 124 of the ego agent 122. These agents may include the ego agent 122 which navigates using sensors and algorithms, as well as other vehicles, pedestrians, and cyclists, all of which may move and influence the navigation of the ego agent 122. Static objects like parked cars and barriers, while not active agents, also impact behavior of the ego agent 122. In a multiagent environment, the ego agent 122 must continuously monitor and predict the actions of these agents to make informed decisions for safe and efficient travel.

As used herein, the term "surrounding environment 124" may refer to a multiagent environment in which a vehicle or a robotic system operates. For a road vehicle, the multiagent environment typically includes roads, traffic signals, other vehicles, pedestrians, and various static and dynamic objects such as road signs, barriers, and construction zones. The vehicle must navigate and interact with these multiple agents, each with their own behaviors and objectives, to ensure safe and efficient travel. For a robotic system, the surrounding environment 124 may encompass areas such as warehouses, manufacturing floors, or similar operational spaces. The multiagent environment includes other robots, human workers, shelves, machinery, and various obstacles. The robot must coordinate and interact with these agents to perform tasks such as picking, placing, transporting goods, or assembling products, while avoiding collisions and optimizing workflow efficiency.

The system 102 may include suitable logic, circuitry, interfaces, and/or code that may be configured to acquire input data 120, which may include road map images 120-1 and historical trajectory information 120-2 of the set of agents 402 in the road map images 120-1. The road map images 120-1 may include a Region of Interest corresponding to the ego agent 122, which may be a specific area surrounding the ego agent 122, an area in front of the ego agent 122, an area behind the ego agent 122, a specific lane or path used by the ego agent 122, and so on. The road map images 120-1 may also include a plurality of map polylines 310 (shown in FIG. 3) associated with the Region of Interest. In an embodiment, the plurality of map polylines 310 may be in form of a set of vectors. In another embodiment, the set of agents 402 may include the ego agent 122.

The system 102 may further be configured to use the acquired input data 120 to train the motion prediction neural network 106 and the routing function network 110. Once trained, the motion prediction neural network 106 and the routing function network 110 may be deployed on the system 102 or a server that may be communicatively coupled to the system 102 and the ego agent 122. The deployment may be done for inference in real-time/near-real time zero-shot prediction scenarios. Examples of the system 102 may include, but are not limited to, a computer workstation, a vehicle Electronic Control Unit (ECU), a mainframe computer, a server, a handheld computer, a smart appliance, a plug-in device, and/or an infotainment system.

The system 102 may store the neural network-based encoder 104, the motion prediction neural network 106, the rule-based prediction model 108, and the routing function network 110. Alternatively, the system 102 may be remotely connected to another system (such as the server 112) that hosts the neural network-based encoder 104, the motion prediction neural network 106, the rule-based prediction model 108, and the routing function network 110. When hosted on another system, the system 102 may send instructions to control training or inference of the motion prediction neural network 106 and the routing function network 110 via remote calls (e.g., API calls).

The neural network-based encoder 104 may include suitable logic, circuitry, interfaces, and/or code that may be configured to transform the input data 120 into a fixed-size vector representation, capturing the essential features and patterns of the input data 120. The neural network-based encoder 104 may involve multiple layers of neurons, including convolutional layers for the road map images 120-1 or recurrent layers for sequences associated with the historical trajectory information 120-2 of the set of agents 402. The neural network-based encoder 104 may extract the plurality of map polylines 310, which may be in form of a set of vectors, from the road map images 120-1. The plurality of map polylines 310 may also include the historical trajectory information 120-2.

Further, the neural network-based encoder 104 may consider each vector of the set of vectors as a node and may construct a graph by linking all the nodes. Hence, the neural network-based encoder 104 may enable refined trajectory prediction and better multimodal predictions. In an exemplary embodiment, the neural network-based encoder 104 may be a Point Net-like polyline encoder.

The motion prediction neural network 106 may include suitable logic, circuitry, interfaces, and/or code that may be configured to predict trajectories of the set of agents 402 based on historical trajectory information 120-2. The set of agents 402 may include agent 402-1, agent 402-2 . . . agent 402-N. For the sake of brevity, only N agents have been shown in FIG. 4. However, in some embodiments, the set of agents 402 may be more than N agents, without limiting the scope of the disclosure.

The motion prediction neural network 106 may further take road map images and the historical trajectory information 120-2 of the set of agents 402 as input. In an example embodiment, the motion prediction neural network 106 may be a motion transformer. The motion prediction neural network 106 may process the historical trajectory information 120-2 in a sequential manner through layers of neural network architectures such as Recurrent Neural Networks (RNNs), Long Short-Term Memory networks (LSTMs), or Transformer models, which are adept at capturing temporal dependencies. The motion prediction neural network 106 may learn patterns and relationships within the historical trajectory information 120-2 during training, where the motion prediction neural network 106 may minimize the error between predictions and actual observed future trajectory. Once trained, the motion prediction neural network 106 may predict future trajectories of the set of agents 402 by extrapolating from the learned patterns, providing outputs in the form of future coordinates or paths, which may be used in applications like autonomous driving and robotics.

The motion prediction neural network 106 includes a scene encoder 106-A and a motion forecasting decoder 106-B. The scene encoder 106-A may generate scene context embeddings from the vectorized representation of the input data 120. In an embodiment, the scene encoder 106-A may use a transformer encoder or other suitable deep learning architectures to extract spatial and semantic information, such as object locations, types, and relationships within the multi-agent environment. The motion forecasting decoder 106-B may be coupled to an output of the scene encoder 106-A.

The motion forecasting decoder 106-B may receive the scene context embeddings. Further, the motion forecasting decoder 106-B may process the received scene context embeddings to generate a first candidate trajectory prediction 314 (shown in FIG. 4) for the set of agents 402. The first candidate trajectory prediction 314 may typically pertain to a set of possible trajectories based on the corresponding historical trajectory information 120-2, current state for the set of agents 402, and contextual information. The contextual information may include information associated with real-time environment around the set of agents 402, such as traffic conditions, weather, and road types. In an embodiment, the motion forecasting decoder 106-B may decode the scene context embeddings to generate a set of possible trajectories, which may include predicted future positions and movements of the set of agents 402. The motion forecasting decoder 106-B may use various techniques, such as recurrent neural networks (RNNs), long short-term memory networks (LSTMs), or transformers to handle the temporal aspects of the prediction task.

The rule-based prediction model 108 may process the input data 120 to generate a second candidate trajectory prediction 316 (shown in FIG. 3) for the set of agents 402. The rule-based prediction model 108 may rely on a set of predefined rules to generate the second candidate trajectory prediction 316. The set of predefined rules may be derived from domain knowledge, expert input, or historical data patterns associated with the set of agents 402. The rule-based prediction model 108 may operate by applying the set of predefined rules to the input data 120 to generate the second candidate trajectory prediction 316 as an output. In an exemplary embodiment, the rule-based prediction model 108 may be a constant velocity prediction model. The constant velocity prediction model is approach used to predict a future trajectory of the set of agents in the multi-agent environment. The model assumes that each agent will continue to move with a constant velocity (both speed and direction) over a prediction horizon. The model uses the agent's current position and velocity to estimate future positions.

The routing function network 110 may include suitable logic, circuitry, interfaces, and/or code that may be configured to determine an optimal trajectory for the set of agents 402. The routing function network 110 may select a final trajectory prediction for the set of agents 402 based on candidate predictions of the motion prediction neural network 106 and the rule-based prediction model 108. The routing function network 110 may consider various factors such as topology of the arena in which the ego agent 122 is running, current traffic conditions, and rules associated with that arena. The routing function network 110 may continuously update its routing tables based on real-time input data.

The server 112 may include suitable logic, circuitry, and interfaces, and/or code that may be configured to receive the input data 120 including the road map images 120-1 and the historical trajectory information 120-2 of the set of agents 402 in the road map images 120-1. In an embodiment, the server 112 may store trained versions of the neural network-based encoder 104, the motion prediction neural network 106, the rule-based prediction model 108, and the routing function network 110 for inference.

The server 112 may be implemented as a cloud server and may execute operations through web applications, cloud applications, HTTP requests, repository operations, file transfer, and the like. Other example implementations of the server 112 may include, but are not limited to, a database server, a file server, a web server, a media server, an application server, a mainframe server, a machine learning server (enabled with or hosting, for example, a computing resource, a memory resource, and a networking resource), or a cloud computing server.

In at least one embodiment, the server 112 may be implemented as a plurality of distributed cloud-based resources by use of several technologies that are well known to those ordinarily skilled in the art. A person with ordinary skill in the art will understand that the scope of the disclosure may not be limited to the implementation of the server 112 and the system 102, as two separate entities. In certain embodiments, the functionalities of the server 112 can be incorporated in its entirety or at least partially in the system 102 without a departure from the scope of the disclosure. In certain embodiments, the server 112 may host the database 114. Alternatively, the server 112 may be separate from the database 114 and may be communicatively coupled to the database 114.

The database 114 may include suitable logic, interfaces, and/or code that may be configured to store reference to the input data 120 including the road map images 120-1 and the historical trajectory information 120-2 of the set of agents 402 in the road map images 120-1. The database 114 may include multiple training datasets including a variety of road map images. The database 114 may be derived from data off a relational or non-relational database, or a set of comma-separated values (csv) files in conventional or big-data storage. The database 114 may be stored or cached on a device, such as a server (e.g., the server 112) or the system 102. The device storing the database 114 may be configured to receive input data related a query, command, or instruction from the system 102 or the server 112. In response, the device may be configured to retrieve and provide response of the query to the system 102 or the server 112.

In some embodiments, the database 114 may be hosted on a plurality of servers stored at the same or different locations. The operations of the database 114 may be executed using hardware including a processor, a microprocessor (e.g., to perform or control performance of one or more operations), a field-programmable gate array (FPGA), or an application-specific integrated circuit (ASIC). In some other instances, the database 114 may be implemented using software.

The communication network 116 may include a communication medium through which the system 102 and the server 112 may communicate with one another.

The communication network 116 may be one of a wired connection or a wireless connection. Examples of the communication network 116 may include, but are not limited to, the Internet, a cloud network, Cellular or Wireless Mobile Network (such as Long-Term Evolution and 5th Generation (5G) New Radio (NR)), satellite communication system (using, for example, low earth orbit satellites), a Wireless Fidelity (Wi-Fi) network, a Personal Area Network (PAN), a Local Area Network (LAN), or a Metropolitan Area Network (MAN). Additionally, the communication network 116 may encompass networks that enable vehicle communication, such as Vehicle-to-Everything (V2X) communication, which includes Vehicle-to-Vehicle (V2V), Vehicle-to-Infrastructure (V2I), Vehicle-to-Network (V2N), and Vehicle-to-Pedestrian (V2P) communication. Cellular V2X (C-V2X) is another example, leveraging cellular networks to facilitate communication between vehicles and other entities. Various devices in the network environment 100 may be configured to connect to the communication network 116 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device-to-device communication, cellular communication protocols, and Bluetooth (BT) communication protocols.

The user device 118 may include a user-interface through which a user may interact with the system 102, send queries, feed commands and instructions, provide the input data 120 for training the motion prediction neural network 106. The user device 118 may be fixed at a place or may be portable. Examples of the user device 118 may include, but are not limited to, a smartphone, a touchpad, a personal computer, a wearable device, an infotainment system, an in-vehicle display, and a voice-controlled device.

In operation, the system 102 may be configured to acquire input data 120. The input data 120 may include the road map images 120-1 and the historical trajectory information 120-2 of the set of agents 402 in the road map images 120-1. The road map images 120-1 may include graphical representations designed to illustrate the layout of roads, highways, and transportation networks within a specific area, such as a city, region, or country. The historical trajectory information 120-2 may typically include the chronological recording of location, speed, direction, and other relevant metrics of each agent of the set of agents 402 at various time intervals. Details related to the acquisition of the input data 120 are further provided, for example, in FIG. 3.

After acquisition of the input data 120, the system 102 may be configured to transform the input data 120 into a vectorized representation (not shown) based on application of the neural network-based encoder 104. The vectorized representation may involve converting the input data 120 into polylines and encoding the polylines into vectors that can be efficiently processed by the motion prediction neural network 106. The vectors may be divided into ego features 306 and object features 3, for example. The term "ego features 306" may refer to features of the ego agent 122, while the term "object features 308" may refer to features of all agents other than the ego agent 122 from the set of agents 402. Details related to transformation of the input data 120 are further provided, for example, in FIG. 3.

After transformation of the input data 120 into the vectorized representation, the system 102 may be configured to generate the first candidate trajectory prediction 314 for the set of agents 402 (includes the ego agent 122). The first candidate trajectory prediction 314 may be generated by application of the motion prediction neural network 106 on the vectorized representation. Details related to generation of the first candidate trajectory prediction are further provided, for example, in FIG. 3.

The system 102 may be configured to generate the second candidate trajectory prediction 316 for the set of agents 402. The system 102 may generate the second candidate trajectory prediction 316 for the set of agents 402 by application of the rule-based prediction model 108 on the acquired input data 120. Details related to generation of the second candidate trajectory prediction 316 are further provided, for example, in FIG. 3.

The system 102 may be configured to train the motion prediction neural network 106 based on the first candidate trajectory prediction 314 and a set of ground truth trajectories of the set of agents 402. Further, the system 102 may be configured to generate ranking results 312 (shown in FIG. 3) for the first candidate trajectory prediction 314 and the second candidate trajectory prediction 316. The system 102 may generate the ranking results 312 for the first candidate trajectory prediction 314 and the second candidate trajectory prediction 316 based on the routing function network 110. Details related to generation of the ranking results 312 are further provided, for example, in FIG. 3.

The system 102 may be further configured to train the routing function network 110 based on the ranking results 312. Details related to training of the motion prediction neural network 106 and the routing function network 110 are further provided, for example, in FIG. 3.

Figure 2:
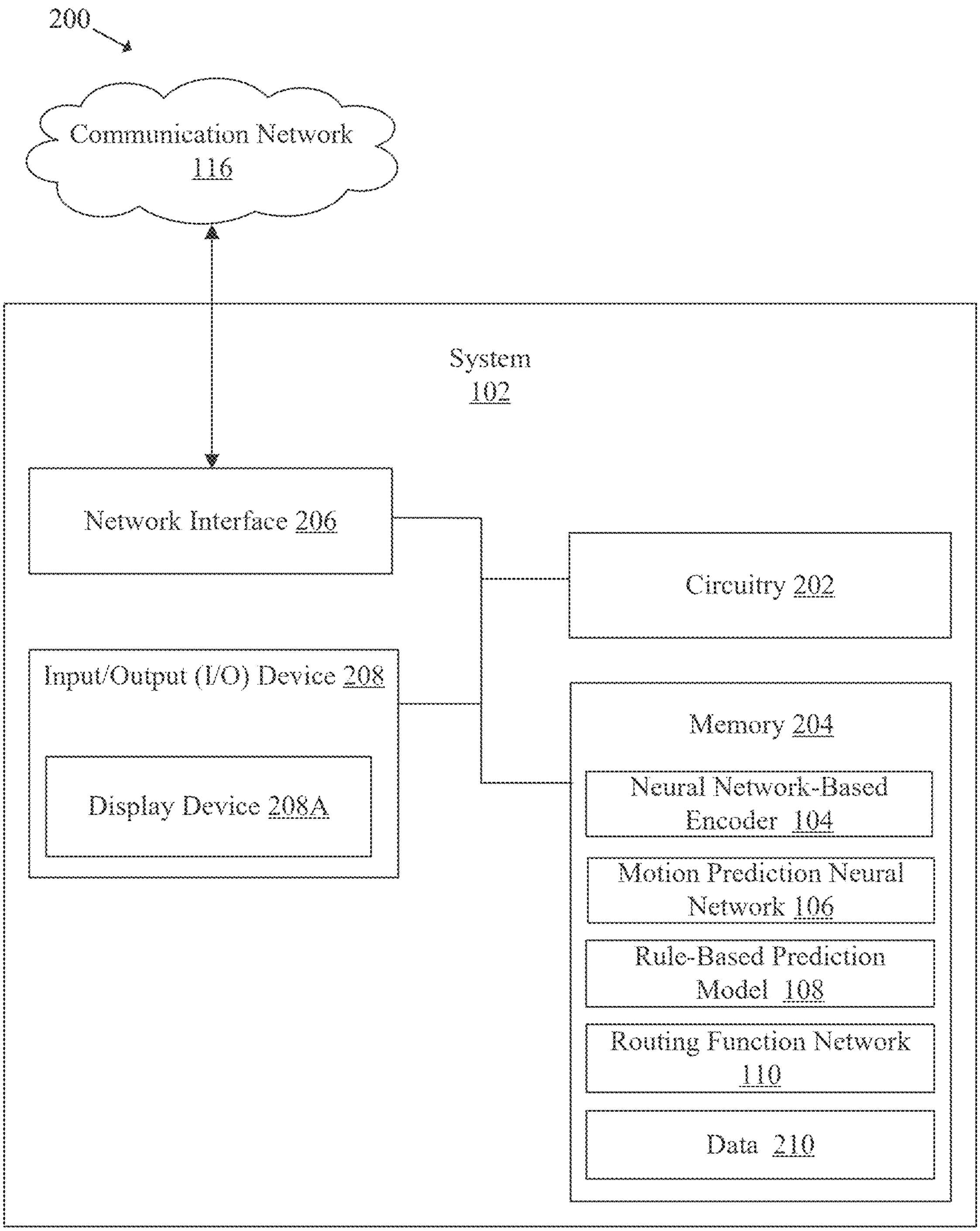
FIG. 2 is a block diagram that illustrates an exemplary system of FIG. 1, in accordance with an embodiment of the disclosure.

FIG. 2 is a block diagram that illustrates an exemplary system of FIG. 1, in accordance with an embodiment of the disclosure. FIG. 2 is explained in conjunction with elements from FIG. 1. With reference to FIG. 2, there is shown a block diagram 200 of the system 102. The system 102 may include circuitry 202, a memory 204, a network interface 206, and an input/output (I/O) device 208. The I/O device 208 may include a display device 208-A. The memory 204 may include the neural network-based encoder 104, the motion prediction neural network 106, the rule-based prediction model 108, and the routing function network 110. The memory 204 may also include data 210, which in turn, may include the input data 120, the vectorized representation, the first candidate trajectory prediction 314, the second candidate prediction, and the ranking results 312. The network interface 206 may connect the system 102 with the server 112, via the communication network 116.

The circuitry 202 may include suitable logic, circuitry, and/or interfaces that may be configured to execute program instructions associated with different operations to be executed by the system 102. The operations may include, for instance, input data acquisition, transformation of the input data into vectorized representation, first candidate trajectory prediction generation, second candidate trajectory prediction generation, motion prediction neural network training, ranking results generation, routing function network training, and the like. The circuitry 202 may include one or more processing units, which may be implemented as a separate processor. In an embodiment, the one or more processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or a combination thereof.

The memory 204 may include suitable logic, circuitry, interfaces, and/or code that may be configured to store one or more instructions to be executed by the circuitry 202. The one or more instructions stored in the memory 204 may be configured to execute the different operations of the circuitry 202 (and/or the system 102). The memory 204 may be further configured to store the data 210. The memory 204 may also be configured to store the neural network-based encoder 104, the motion prediction neural network 106, the rule-based prediction model 108, and the routing function network 110. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may include suitable logic, circuitry, interfaces, and/or code that may be configured to facilitate communication between the system 102 and the server 112, via the communication network 116. The network interface 206 may be implemented by use of various known technologies to support wired or wireless communication of the system 102 with the communication network 116. The network interface 206 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 206 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The I/O device 208 may include suitable logic, circuitry, interfaces, and/or code that may be configured to receive an input and provide an output based on the received input. For example, the I/O device 208 may receive the data 210. The I/O device 208 may be further configured to render the generated ranking results 312, the generated first candidate trajectory prediction 314, and the generated second candidate trajectory prediction 316 on the user interface, for instance, the user device 118. Examples of the I/O device 208 may include, but are not limited to, a display (e.g., a touch screen), a keyboard, a mouse, a joystick, a microphone, or a speaker. Examples of the I/O device 208 may further include braille I/O devices, such as, braille keyboards and braille readers.

The display device 208-A may include suitable logic, circuitry, and interfaces that may be configured to display or render the generated ranking results 312, the generated first candidate trajectory prediction 314, and the generated second candidate trajectory prediction 316. The display device 208-A may be a touch screen which may enable a user to provide a user-input via the display device 208-A. The touch screen may be at least one of a resistive touch screen, a capacitive touch screen, or a thermal touch screen. The display device 208-A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 208-A may refer to a display screen of a head mounted device (HMD), a smart-glass device, a see-through display, a projection-based display, an electro-chromic display, or a transparent display.

Figure 3:
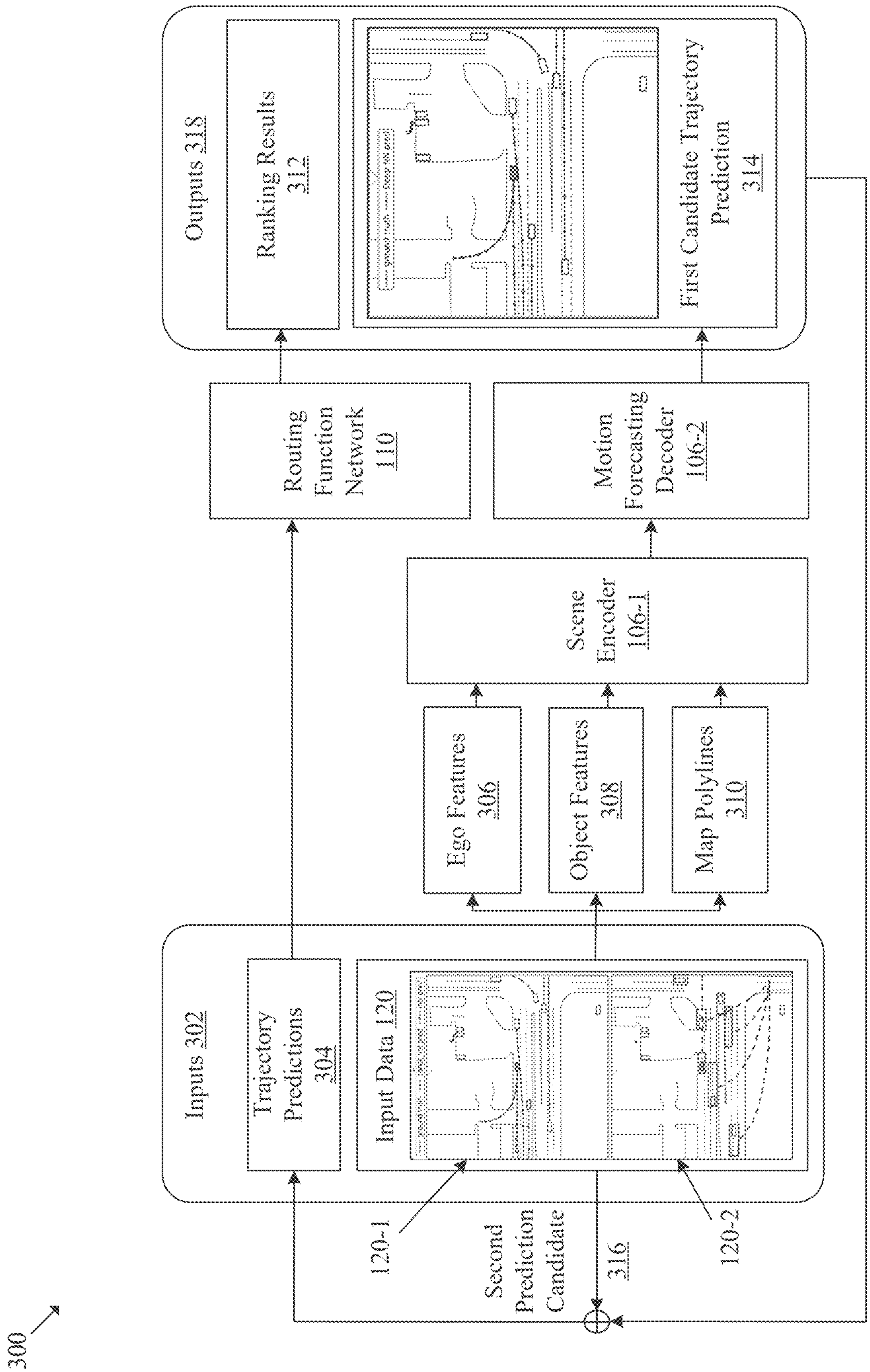
FIG. 3 is a flow diagram that illustrates exemplary functions of the system of FIG. 1, in accordance with an embodiment of the disclosure.

Various operations of the circuitry 202 for motion forecasting, are described further, for example, in FIG. 3.

FIG. 3 is a flow diagram that illustrates exemplary operations of the system of FIG. 1, in accordance with an embodiment of the disclosure. FIG. 3 is explained in conjunction with elements from FIG. 1 and FIG. 2. With reference to FIG. 3, there is shown a flow diagram 300 of exemplary operations of the system 102 of FIG. 1. Exemplary operations for implementation of motion forecasting may be executed by any computing system, for example, by the system 102 of FIG. 1 or by the circuitry 202 of FIG. 2.

During operation, the circuitry 202 may acquire the input data 120. The input data 120 may be a part of a training dataset of motion data with object trajectories and corresponding 3D maps for a plurality of scenes. In an embodiment, the circuitry 202 may receive the training dataset from an external data source such as the database 114 or may retrieve the training dataset from the memory 204 of the system 102. The dataset may include a substantial collection of object data, featuring objects or agents with unique tracking IDs. For instance, the dataset may include labels for three distinct object classes: vehicles, pedestrians, and cyclists. Each object or agent may be encapsulated within 3D bounding boxes. The dataset may be meticulously mined for intriguing behaviors and scenarios pertinent to behavior prediction research, such as unprotected turns, merges, lane changes, and intersections. Additionally, the dataset may encompass comprehensive 3D map data for each segment, covering various locations such as San Francisco, Phoenix, Mountain View, Los Angeles, Detroit, and Seattle. The maps may be enriched with detailed features such as lane centers, lane boundaries, road boundaries, crosswalks, speed bumps, and stop signs, with added entrances to driveways.

The input data 120 may include the road map images 120-1 and the historical trajectory information 120-2 of the set of agents 402 in the road map images 120-1. The circuitry 202 may execute an operation to transform the input data 120 into a vectorized representation. For the transformation, the input data 120 may be first transformed into polylines (which may be normalized to the coordinate system centered at the agent of interest such as an ego agent) and the neural network-based encoder 104 (e.g., polyline encoder) may be used to encode each polyline as an input token feature (i.e., the vectorized representation) for the scene encoder 106-1 (e.g., transformer encoder).

In accordance with an embodiment, the circuitry 202 may apply the neural network-based encoder 104 on the acquired input data 120 to generate the vectorized representation. Specifically, the input data 120 may be transformed by representing each road component and agent trajectory of the set of agents 402 in the road map images 120-1 as a set of vectors. The process may begin with the representation of map features such as lane boundaries, crosswalks, and stop signs. These features may be points, polygons, or curves in geographic coordinates. For instance, a lane boundary may be represented by multiple control points forming a spline, a crosswalk by a polygon defined by several points, and a stop sign by a single point. The process may involve selecting a starting point and direction, uniformly sampling key points from the splines at the same spatial distance, and sequentially connecting the neighboring key points into vectors. For agent trajectories, key points may be sampled at fixed temporal intervals (e.g., every 0.1 seconds) starting from time t=0, and these key points may be then connected sequentially into vectors. Each road user and road structure may be represented as a polyline, which is a sequence of vectors. A polyline is composed of vectors, with each vector containing information such as the start point, end point, and additional attributes. In the graph construction phase, each vector may be treated as a node in a graph, with node features including the start location, end location, and other relevant attributes. These nodes may be then used to construct subgraphs and a global interaction graph to model the interactions among all components.

The neural network-based encoder 104 may be a polyline encoder that may operate by encoding both the agent trajectories and the road map, which are represented as polylines. Each polyline may be composed of multiple points, with each point having several attributes such as location and road type. The polyline encoder may employ a PointNet-like structure, incorporating a multilayer perceptron (MLP) network and max-pooling to summarize the features of each polyline. Initially, the road map and agent trajectories may be organized as polylines, with each polyline containing several points, each with attributes like location and road type. A three-layer MLP may be then used to encode each polyline by processing the attributes of each point to generate a feature representation for the polyline. Max-pooling may be subsequently applied to the features generated by the MLP to summarize the features of each polyline, resulting in a single feature vector for each polyline. Finally, both the agent features (i.e., ego features 306 and object features 308) and map features may be projected to a n-dimensional feature space using another linear layer. By encoding the polylines in this manner, the polyline encoder may generate the vector representation that captures the essential information about the agent trajectories and the road map, which may be used as input for further processing in the scene encoder 106-1.

The circuitry 202 may execute an operation to generate the first candidate trajectory prediction 314 for the set of agents 402 by application of the motion prediction neural network 106 on the vectorized representation. The first candidate trajectory prediction 314 may be generated for a set of future timesteps (with respect to timesteps associated with the input data 120).

In an exemplary embodiment, the scene encoder 106-A of the motion prediction neural network 106 may receive the vectorized representation from the neural network-based encoder 104. For example, the vectorized representation may include the ego features 306, the object features 308, and the plurality of map polylines 310 (also referred to as map polylines 310) associated with a Region of Interest. Further, the scene encoder 106-1 may generate scene context embeddings from the vectorized representation. In case the scene encoder 106-1 is a transformer encoder of a motion transformer, the scene encoder 106-1 may enforce local attention which emphasizes the focus on local context information by adopting k-nearest neighbor to find k closest polylines to the polyline of interest from the vector representation. The scene context encoded by the scene encoder 106-1 may be then enhanced by a dense future prediction, which contains future interaction information.

The motion forecasting decoder 106-B of the motion prediction neural network 106 may receive the scene context embeddings from the scene encoder 106-A, along with the static intention and dynamic searching query pair and a query content feature as input. The motion forecasting decoder 106-B may process the input and apply a prediction head to each decoder layer of the motion forecasting decoder 106-2 to generate future trajectories (i.e., the first candidate trajectory prediction 314 for the set of agents 402), which may be represented by a Gaussian Mixture Model to capture multimodal agent behaviors. In some instances, the future trajectories may be multimodal in nature.

The circuitry 202 may further execute an operation to generate the second candidate trajectory prediction 316 for the set of agents 402 by applying the rule-based prediction model 108 to the acquired input data 120. Similar to the first candidate trajectory prediction 314, the second candidate trajectory prediction 316 may be intended for a set of future timesteps. The rule-based prediction model 108 may utilize a set of predefined rules to generate the second candidate trajectory prediction 316. These predefined rules may be derived from domain knowledge, expert input, or historical data patterns associated with the set of agents 402. The rule-based prediction model 108 operates by applying these predefined rules to the input data 120, resulting in the second candidate trajectory prediction 316. One instance of the rule-based prediction model 108 is the constant velocity model. The constant velocity model assumes that each agent in the set of agents 402 will continue to move at a constant velocity over the prediction horizon. This model may be based on the principle that, in the absence of external forces or changes in behavior, an agent's velocity remains unchanged. To generate the second candidate trajectory prediction 316 using the constant velocity model, the current velocity of each agent may be first determined based on the most recent position data from the input data 120. Using this calculated velocity, the future positions of each agent may be then estimated for the set of future timesteps by projecting the current velocity forward in time. These estimated future positions may be compiled into a trajectory for each agent. By relying on the constant velocity model, the rule-based prediction model 108 may provide a straightforward and computationally efficient method for predicting future trajectories.

In an embodiment, candidate trajectory predictions 304 such as the first candidate trajectory prediction 314 and the second candidate trajectory prediction 316 may be stored in the memory 204 for further processing in both training and inference phases of the motion prediction neural network 106 and routing function network 110.

In another embodiment, the first candidate trajectory prediction 314 and the second candidate trajectory prediction 316 may be incorporated back into the input data 120 and considered as inputs 302 during the training phase of the motion prediction neural network 106 and routing function network 110.

As part of a training workflow, the circuitry 202 may execute an operation to train the motion prediction neural network 106 based on the first candidate trajectory prediction 314 and a set of ground truth trajectories of the set of agents 402. In an exemplary embodiment, the circuitry 202 may compare each predicted trajectory from the first candidate trajectory prediction 314 with a corresponding ground truth trajectory of the set of ground truth trajectories. The circuitry 202 may further compute a first loss based on the comparison, wherein the first loss may correspond to a difference between the compared predicted trajectory from the first candidate trajectory prediction 314 and the corresponding ground truth trajectory of the set of ground truth trajectories. As an example, the prediction task for the motion prediction neural network 106 may be formulated as Gaussian Mixture prediction and the first loss may be a negative log-likelihood loss that maximizes the likelihood of the set of ground truth trajectories. The circuitry 202 may train the motion prediction neural network 106 based on the first loss.

The circuitry 202 may execute an operation to generate the ranking results 312 for the candidate trajectory predictions 304, such as the first candidate trajectory prediction 314 and the second candidate trajectory prediction 316. The circuitry 202 may generate the ranking results 312 for the first candidate trajectory prediction 314 and the second candidate trajectory prediction 316 based on the routing function network 110. In an exemplary embodiment, the circuitry 202 may select a first set of predicted trajectories for the set of agents 402 from the first candidate trajectory prediction 314. The circuitry 202 may also select a second set of predicted trajectories for the set of agents 402 from the second candidate trajectory prediction 316. The circuitry 202 may further compute a first average displacement error across the set of future timesteps based on first distances between the selected first set of predicted trajectories and the set of ground truth trajectories. The circuitry 202 may further compute a second average displacement error across the set of future timesteps based on second distances between the selected second set of predicted trajectories and the set of ground truth trajectories. The circuitry 202 may further generate the ranking results 312 for the first candidate trajectory prediction 314 and the second candidate trajectory prediction 316 based on a comparison of the first average displacement error with the second average displacement error.

If the first average displacement error is less than the second average displacement error, the circuitry 202 may generate positive ranking results for the first candidate trajectory prediction 314 and negative ranking results for the second candidate trajectory prediction 316. If the first average displacement error is more than the second average displacement error, the circuitry 202 may generate negative ranking results for the first candidate trajectory prediction 314 and positive ranking results for the second candidate trajectory prediction 316. If the first average displacement error and the second average displacement error are more than a threshold error defined based on the set of ground truth trajectories, the circuitry 202 may generate negative ranking results for the first candidate trajectory prediction 314 as well as the second candidate trajectory prediction 316. The ranking results 312 and the candidate trajectory predictions may be considered as outputs 318.

The circuitry 202 may execute an operation to train the routing function network 110 based on the ranking results 312. In an exemplary embodiment, the circuitry 202 may compute a second loss based on the ranking results 312 and may train the routing function network 110 based on the computed second loss. The routing function network 110 may be trained simultaneously with the motion prediction neural network 106 using the second loss function. The second loss function may result in a more stable training process than other loss functions such as cross-entropy loss. An example of the second loss function is provided in equation (1), as follows:

$$L(\theta) = -E_{(s,\hat{x})\sim D}\left[\log\left(\sigma\left(R_\theta\left(s^{1:Th}, \hat{x}_{chosen}^{Th+1:T}\right) - R_\theta\left(s^{1:Th}, \hat{x}_{rejected}^{Th+1:T}\right)\right)\right)\right] \quad (1)$$

where, $$R_\theta\left(., \hat{x}_{chosen}^{Th+1:T}\right)$$

pertains to scores associated with the ranking results 312 of selected/chosen prediction candidate, $$R_\theta\left(s^{1:Th}, \hat{x}_{rejected}^{Th+1:T}\right)$$

pertains to scores associated with the ranking results 312 of rejected prediction candidate, σ(.) pertains to a layer of Rectified Linear Unit (ReLU), $\hat{x}^{Th+1:T}$ pertains to a prediction candidate generated by the motion prediction neural network 106.

In an example embodiment, the training workflow may involve initializing the motion prediction neural network 106 ($Q_\phi$), the routing function network 110 ($R_\theta$), a rule-based prediction model (f), a training dataset (D) containing vehicle trajectories, and a data buffer ($D_{rf}$) for routing function network training. During the training phase, for each epoch, the rule-based and learning-based predictions (i.e., the first and second candidate trajectory predictions 314 and 316) may be generated for each sample in the dataset. The parameters (ϕ) of the motion prediction neural network 106 may be updated based on the prediction loss (Lpred), and the predictions may be ranked by Average Displacement Error (ADE). The parameters (θ) of the routing function network 110 may be then updated according to the ranking. During the inference phase, for each sample in the test dataset ($D_{test}$), both rule-based and learning-based predictions may be generated. The final output prediction may be selected based on the routing function's evaluation, which chooses the prediction with the highest score. This workflow ensures that the models (i.e., the motion prediction neural network and the routing function network 110) are trained effectively and make accurate predictions during inference.

FIG. 4 is an exemplary diagram illustrating a multi-agent environment, in accordance with an embodiment of the disclosure. FIG. 4 is explained in conjunction with elements from FIG. 1, FIG. 2, and FIG. 3. With reference to FIG. 4, a multi-agent environment 400 is shown, which includes a set of agents 402 maneuvering around a roundabout 404. The set of agents 402 may include the agent 402-1, the agent 402-2, and so on up to the agent 402-N. For the sake of brevity, only N agents are shown in FIG. 4. However, in some embodiments, the set of agents 402 may include more than N agents, without limiting the scope of the disclosure.

Agent 402-1 may be the ego agent 122, in which system 102 may be implemented. System 102 may focus on zero-shot scenarios and may evaluate the motion prediction neural network 106, the rule-based prediction model 108, and the routing function network 110 on test samples associated with a testing dataset, where the test samples may be unique and not observed during training.

As shown, the surrounding environment 124 of the agent 402-1 includes the roundabout 404 at an intersection of four tracks including track 406, track 408, track 410, and track 412. A flyover 414 is extended parallel to the track 412. The surrounding environment 124 of the agent 402-1 may further include the agent 402-2 and the agent 402-N. System 102 may acquire input data 120, including road map images 120-1 and historical trajectory information 120-2. The historical trajectory information 120-2 may include a set of historical trajectories including trajectory 416-1, 416-2 . . . 416-N, where each historical trajectory of the set of historical trajectories is associated with one agent of the set of agents 402.

In an exemplary embodiment, for the ego agent 402-1, the system 102 may deploy the motion prediction neural network 106 to generate a first set of predicted trajectories including trajectory 418-1, 418-2 . . . 418-N associated with the first candidate trajectory prediction 314 for the set of agents 402. System 102 may also deploy the rule-based prediction model 108 to generate a second set of predicted trajectories including trajectory 420-1, 420-2 . . . 420-N associated with the second candidate trajectory prediction 316 for the set of agents 402. Further, system 102 may deploy the routing function network 110 to generate the ranking results 312 for the first set of predicted trajectories and the second set of predicted trajectories based on comparison with a set of ground truth trajectories including trajectory 422-1, 422-2 . . . 422-N.

The system 102 may use various other details such as scene and context information at a given timestamp or time-interval in order to generate the first set of predicted trajectories and the second set of predicted trajectories. In an embodiment, a single agent trajectory in an $i^{th}$ scene may be represented by the equation (2), as follows:

$$x_i^{1:Th} = x_i^t | t \in \{1 \ldots T\} \tag{2}$$

where, $$x_i^t$$

may represent a series of features of the agent from timestep 1 to T.

Further, the set of agents 402 may interact with each other within the multi-agent environment (surrounding environment 124). Context information related to the interaction of the set of agents 402 in the multi-agent environment $$(c_i^{1:T})$$

may be represented by the equation (3), as follows:

$$c_i^{1:T} = c_i^t | t \in (1, T) \tag{3}$$

Further, $i^{th}$ scene may be denoted by the equation (4), as follows:

$$s_i = \{(x_i^t, c_i^t) | t \in (1, T)\} \tag{4}$$

The motion prediction neural network 106 may predict future trajectory distribution $$p = (x_i^{Th+1:Tf} | x_i^{1:Th}, c_i^{1:Th})$$

for the agent, for instance, the ego agent 402-1. Here, $$x_i^{1:Th}$$

represents history features (states) of the historical trajectories associated with the corresponding historical trajectory information.

$$c_i^{1:Th}$$

represents context information in the $i^{th}$ scene. T=Th+Tf may represent the total time horizon, in which Th is the history horizon, and Tf is the lookahead horizon.

The system 102 may improve the generalization ability of the motion prediction neural network 106. For instance, the motion prediction neural network 106 may be trained on one dataset (training dataset), represented by, $D_T=\{(s_i|i\in(1, M_T)\}$, and tested on another dataset represented by, $D_E=\{(s_i|i\in(1, M_E)\}$. Here, $M_T$ denotes multi-agent training environment and $M_E$ denotes multi-agent testing or evaluation environment. The training dataset and the testing dataset may or may not be generated from a common underlying distribution.

In one instance, based on the historical trajectory 416-1 of ego agent 402-1 on track 406, the motion prediction neural network 106 may generate a first predicted trajectory 418-1 extending towards the track 408. The rule-based prediction model 108 may generate a second predicted trajectory 420-1 extending towards the track 412. Furthermore, ground truth trajectory 422-1 also extends towards the track 408. Hence, system 102 generates positive ranking results for the first predicted trajectory 418-1 and negative ranking results for the second predicted trajectory 420-1. Consequently, the first predicted trajectory 418-1 may be selected as the final trajectory based on the ranking results 312.

In another instance, system 102 may track agent 402-2 moving behind ego agent 402-1. Based on the historical trajectory 416-2 of agent 402-2 on the track 406, the motion prediction neural network 106 may generate a first predicted trajectory 418-2 of the agent 402-2 extending towards the track 408. The rule-based prediction model 108 may generate a second predicted trajectory 420-2 of the agent 402-2 extending towards the track 410. Furthermore, ground truth trajectory 422-2 of the agent 402-2 also extends towards the track 408. Hence, system 102 generates positive ranking results for the first predicted trajectory 418-2 and negative ranking results for the second predicted trajectory 420-2. Consequently, the first predicted trajectory 418-2 may be selected as the final trajectory based on the ranking results 312.

In yet another instance, system 102 may track agent 402-N moving ahead of ego agent 402-1. Based on the historical trajectory 416-N of agent 402-N on the track 412, the motion prediction neural network 106 may generate a first predicted trajectory 418-N of the agent 402-N extending on the track 412 itself. The rule-based prediction model 108 may generate a second predicted trajectory 420-N of the agent 402-N extending towards the flyover 414. Furthermore, the ground truth trajectory (shown by the fourth dashed lines in FIG. 4) also extends towards the track 412. Hence, system 102 generates positive ranking results for the first predicted trajectory 418-N and negative ranking results for the second predicted trajectory 420-N. Consequently, the first predicted trajectory 418-N may be selected as the final trajectory based on the ranking results 312.

Figure 5:
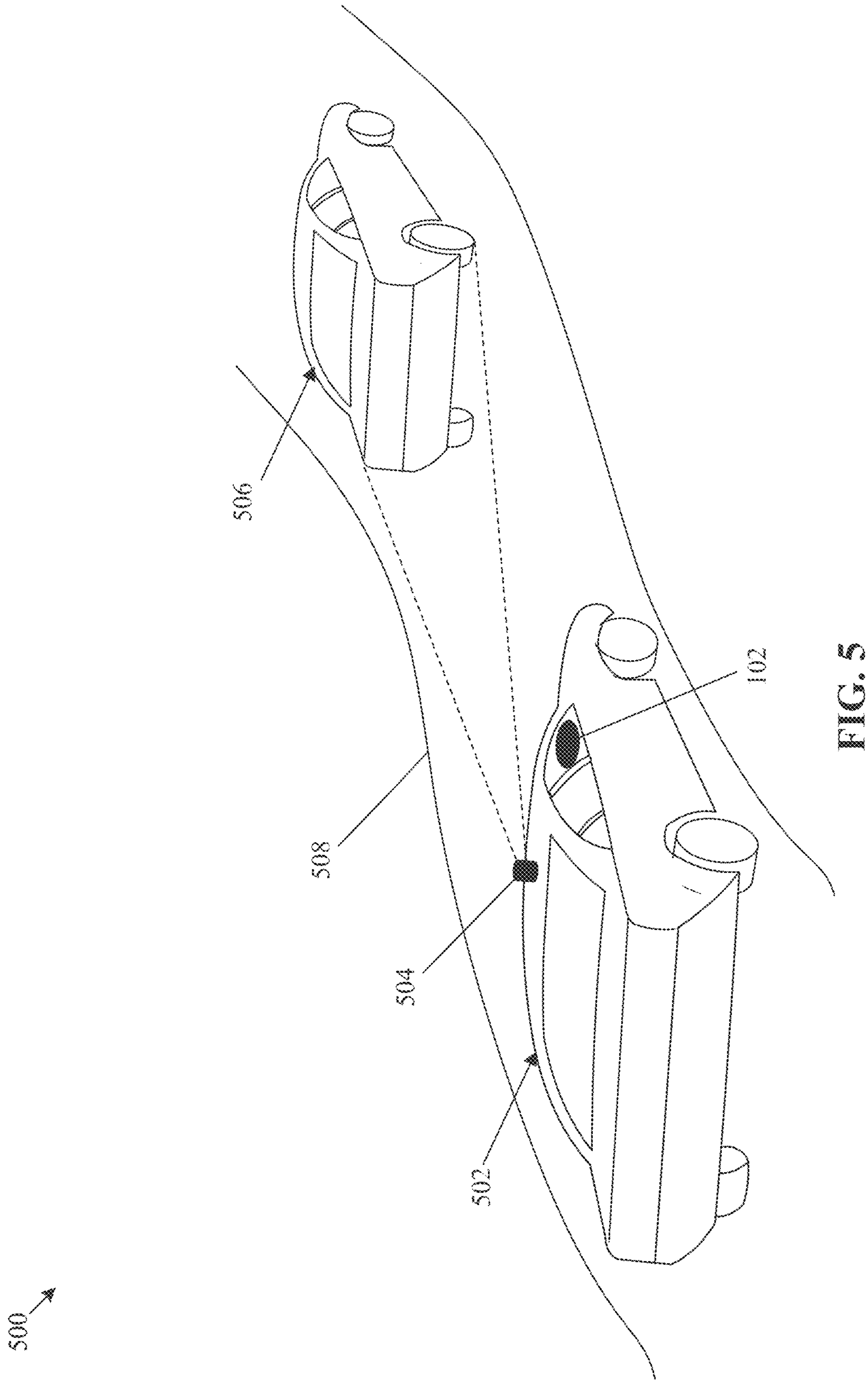
FIG. 5 is an exemplary diagram that illustrates operations performed by the system of FIG. 1 in a real-time scenario, in accordance with an embodiment of the disclosure.

FIG. 5 is an exemplary diagram that illustrates operations performed by the system of FIG. 1 in a real-time scenario, in accordance with an embodiment of the disclosure. FIG. 5 is explained in conjunction with elements from FIG. 1, FIG. 2, FIG.

3, and FIG. 4. With reference to FIG. 5, an exemplary diagram 500 illustrates operations performed by the system of FIG. 1 in a real-time scenario. In an exemplary embodiment, during inference in a real-time scenario, the ego agent 122, such as an ego-vehicle 502, may be maneuvering on a track 508, while an agent 402-N, such as a vehicle 506, may be moving ahead of the ego-vehicle 502. The ego-vehicle 502 may include the sensor module, such as LiDAR 504, positioned on the roof of the ego-vehicle 502. The LiDAR 504 may transmit laser to scan the environment surrounding the ego-vehicle 502 to detect the features including other vehicles (such as the vehicle 506) and a map of the environment. Further, the system 102 may acquire the input data 120 by processing the scan. The input data 120 may include the road map images 120-1 and the historical trajectory information 120-2 associated with the set of agents 402, including the vehicle 506 in the road map images 120-1. The system 102 may also acquire the road map images 120-1 through the server 112.

The system 102 may transform the input data into a vectorized representation. Further, the system 102 may generate the first candidate trajectory prediction 314 for the set of agents 402 by applying the motion prediction neural network 106 (i.e., a network trained on motion prediction task, as described in FIG. 3) to the vectorized representation. Additionally, the system 102 may generate the second candidate trajectory prediction 316 for the set of agents 402 by applying the rule-based prediction model 108 to the acquired input data 120. Thereafter, the system 102 may generate the ranking results 312 for the first candidate trajectory prediction 314 and the second candidate trajectory prediction 316 based on the routing function network 110 (i.e., a network trained for scoring of trajectory predictions, as described in FIG. 3). Further, the system 102 may select a final trajectory prediction for the set of agents 402, including the vehicle 506, as one of the first candidate trajectory prediction 314 and the second candidate trajectory prediction 316 based on the ranking results 312.

Figure 6:
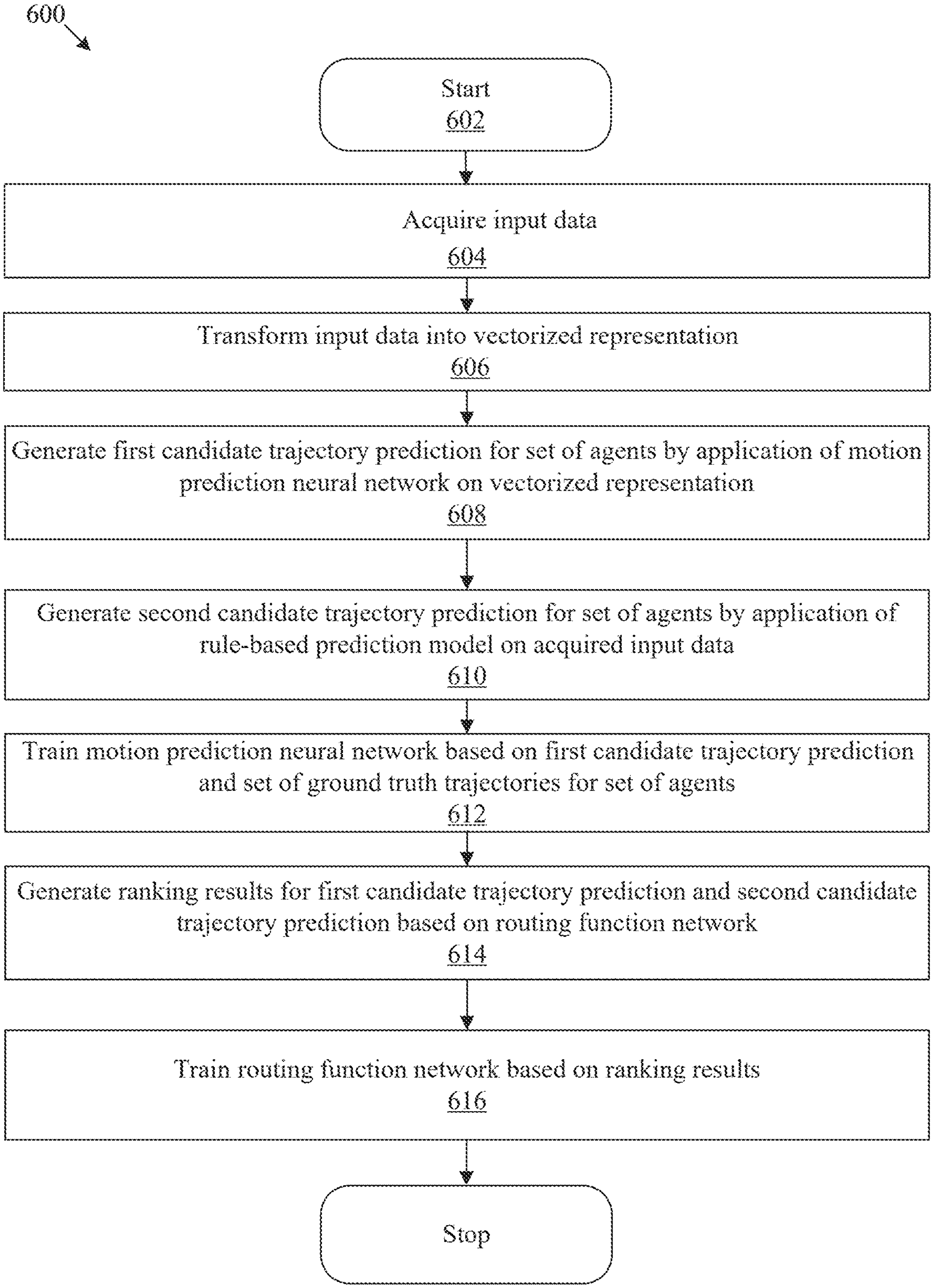
FIG. 6 is a flowchart that illustrates exemplary operations of a method for motion forecasting, in accordance with an embodiment of the disclosure.

FIG. 6 is a flowchart that illustrates operations of an exemplary method for motion forecasting, in accordance with an embodiment of the disclosure. FIG. 6 is described in conjunction with elements from FIG. 1, FIG. 2, FIG. 3, FIG. 4, and FIG. 5. With reference to FIG. 6, there is shown a flowchart 600. The flowchart 600 may include operations from 602 to 616 and may be implemented by the system 102 of FIG. 1 or by the circuitry 202 of FIG. 2. The flowchart 600 may start at 602 and proceed to 604.

At 604, an input data may be acquired. The circuitry 202 may be configured to receive the input data 120 including the road map images 120-1 and the historical trajectory information 120-2 of the set of agents 402 in the road map images 120-1. Details related to the acquisition of the input data are further described, for example, in FIG. 3.

At 606, vectorized representation may be generated. The circuitry 202 may be configured to generate vectorized representation based on the acquired input data 120. Details related to the generation of the vectorized representation are further described, for example, in FIG. 3.

At 608, first candidate trajectory prediction may be generated. The circuitry 202 may be configured to generate the first candidate trajectory prediction 314 for the set of agents 402 by application of the motion prediction neural network 106 on the generated vectorized representation. Details related to the generation of the first candidate trajectory prediction 314 are further described, for example, in FIG. 3.

At 610, second candidate trajectory prediction may be generated. The circuitry 202 may be configured to generate the second candidate trajectory prediction 316 for the set of agents 402 by application of the rule-based prediction model 108 on the acquired input data 120. Details related to the generation of the second candidate trajectory prediction 316 are further described, for example, in FIG. 3.

At 612, motion prediction neural network may be train. The circuitry 202 may be configured to train the motion prediction neural network 106 based on the first candidate trajectory prediction 314 and a set of ground truth trajectories of the set of agents 402. Details related to the training of the motion prediction neural network are further described, for example, in FIG. 3.

At 614, ranking results may be generated. The circuitry 202 may be configured to generate the ranking results 312 for the first candidate trajectory prediction 314 and the second candidate trajectory prediction 316 based on the routing function network 110. Details related to the generation of the ranking results 312 are further described, for example, in FIG. 3.

At 616, routing function network may be trained. The circuitry 202 may be configured to train the routing function network 110 based on the ranking results 312. Details related to the training of the routing function network are further described, for example, in FIG. 3.

Although the flowchart 600 is illustrated as discrete operations, such as, 602, 604, 606, 608, 610, 612, 614, and 616, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate a system (for example, the system 102 of FIG. 1). Such instructions may cause the system 102 to perform operations that may include acquisition of input data (for example, the input data 120 of FIG. 1) including road map images (for example, the road map images 120-1 of FIG. 1) and historical trajectory information (for example, the historical trajectory information 120-2 of FIG. 1) of a set of agents (for example, the set of agents 402 of FIG. 4) in the road map images 120-1. The operations may further include generation of vectorized representation based on the acquired input data 120. The operations may further include generation of a first candidate trajectory prediction (for example, the first candidate trajectory prediction 314 of FIG. 3) for the set of agents 402 by application of a motion prediction neural network (for example, the motion prediction neural network 106 of FIG. 1) on the generated vectorized representation. The operations may further include generation of second candidate trajectory prediction (for example, the second candidate trajectory prediction 316 of FIG. 3) for the set of agents 402 by application of a rule-based prediction model (for example, the rule-based prediction model 108 of FIG. 1) on the acquired input data 120. The operations may further include training of the motion prediction neural network 106 based on the first candidate trajectory prediction 314 and a set of ground truth trajectories of the set of agents 402. The operations may further include generation of ranking results (for example, the ranking results 312 of FIG. 3) for the first candidate trajectory prediction 314 and the second candidate trajectory prediction 316 based on a routing function network (for example, the routing function network 110 of FIG. 1). The operations may further include training of the routing function network 110 based on the ranking results 312.

Various embodiments of the disclosure may provide a non-transitory computer-readable medium and/or storage medium having stored thereon, computer-executable instructions executable by a machine and/or a computer to operate a system (for example, the system 102 of FIG. 1). Such instructions may cause the system 102 to perform operations that may include acquisition of input data (for example, the input data 120 of FIG. 1) including road map images (for example, the road map images 120-1 of FIG. 1) and historical trajectory information (for example, the historical trajectory information 120-2 of FIG. 1) of a set of agents (for example, the set of agents 402 of FIG. 4) in the road map images 120-1. The operations may further include generation of vectorized representation based on the acquired input data 120 and generation of first candidate trajectory prediction (for example, the first candidate trajectory prediction 314 of FIG. 3) for the set of agents 402 by application of a motion prediction neural network (for example, the motion prediction neural network 106 of FIG. 1) on the generated vectorized representation. The operations may further include generation of a second candidate trajectory prediction (for example, the second candidate trajectory prediction 316 of FIG. 3) for the set of agents 402 by application of a rule-based prediction model (for example, the rule-based prediction model 108 of FIG. 1) on the acquired input data 120. The operations may further include generation of ranking results (for example, the ranking results 312 of FIG. 3) for the first candidate trajectory prediction 314 and the second candidate trajectory prediction 316 based on a routing function network (for example, the routing function network 110 of FIG. 1). The operations may further include selection of a final trajectory prediction for the set of agents as one of the first candidate trajectory prediction 314 and the second candidate trajectory prediction 316 based on the ranking results 312.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. A system, comprising:

circuitry that:

acquires input data including road map images and historical trajectory information of a set of agents in the road map images;

transforms the input data into a vectorized representation;

generates a first candidate trajectory prediction for the set of agents by application of a motion prediction neural network on the vectorized representation;

generates a second candidate trajectory prediction for the set of agents by application of a rule-based prediction model on the acquired input data;

generates ranking results for the first candidate trajectory prediction and the second candidate trajectory prediction based on a routing function network; and select a trajectory for at least one agent based on the ranking results; and a vehicle control system configured to control motion of an ego agent based on the selected trajectory.

2. The system according to claim 1, wherein the ego agent is included in the set of agents.

3. The system according to claim 1, wherein the ego agent corresponds to an autonomous vehicle and the set of agents corresponds to a set of moving objects in the scene.

4. The system according to claim 1, wherein the motion prediction neural network comprises a scene encoder and a motion forecasting decoder coupled to an output of the scene encoder.

5. The system according to claim 4, wherein the circuitry further:

applies a neural network-based encoder on the acquired input data to generate the vectorized representation;

generates scene context embeddings based on application of the scene encoder on the vectorized representation; and generates the first candidate trajectory prediction for the set of agents based on application of the motion forecasting decoder on the scene context embeddings.

6. The system according to claim 1, wherein the motion prediction neural network is a motion transformer.

7. The system according to claim 1, wherein the rule-based prediction model is a constant velocity model.

8. The system according to claim 1, wherein;

the circuitry is further configured to:

compute a first loss based on the comparison between the first candidate trajectory prediction and corresponding ground truth trajectories;

compute a second loss based on ranking results; and train the motion prediction neural network and the routing function network based on the computed first and second losses; and the vehicle control system is configured to control motion of the ego agent based on a trajectory selected by the circuitry.

9. The system according to claim 1, wherein each of the first candidate trajectory prediction and the second candidate trajectory prediction is for a set of future timesteps.

10. The system according to claim 9, wherein the circuitry further:

selects a first set of predicted trajectories for the set of agents from the first candidate trajectory prediction;

selects a second set of predicted trajectories for the set of agents from the second candidate trajectory prediction;

computes a first average displacement error across the set of future timesteps based on first distances between the selected first set of predicted trajectories and the set of ground truth trajectories; and computes a second average displacement error across the set of future timesteps based on second distances between the selected second set of predicted trajectories and the set of ground truth trajectories, wherein the ranking results for the first candidate trajectory prediction and the second candidate trajectory prediction are generated based on a comparison of the first average displacement error with the second average displacement error.

11. The system according to claim 1, wherein the circuitry further:

computes a second loss based on the ranking results; and trains the routing function network based on the computed second loss.

12. A system, comprising:

circuitry configured to:

acquire input data including road map images and historical trajectory information of a set of agents in the road map images;

transform the input data into a vectorized representation;

generate a first candidate trajectory prediction for the set of agents by application of a motion prediction neural network on the vectorized representation;

generate a second candidate trajectory prediction for the set of agents by application of a rule-based prediction model on the acquired input data;

generate ranking results for the first candidate trajectory prediction and the second candidate trajectory prediction based on a routing function network;

select a trajectory for at least one agent based on the ranking results; and a vehicle control system configured to control motion of an ego agent based on the trajectory selected by the circuitry.

13. The system according to claim 12, wherein the ego agent is included in the set of agents.

14. The system according to claim 12, wherein the ego agent corresponds to an autonomous vehicle and the set of agents corresponds to a set of moving objects in the scene.

15. The system according to claim 12, wherein the motion prediction neural network comprises a scene encoder and a motion forecasting decoder coupled to an output of the scene encoder.

16. The system according to claim 15, wherein the circuitry further:

applies a neural network-based encoder on the acquired input data to generate the vectorized representation;

generates scene context embeddings based on application of the scene encoder on the vectorized representation; and generates the first candidate trajectory prediction for the set of agents based on application of the motion forecasting decoder on the scene context embeddings.

17. The system according to claim 12, wherein the motion prediction neural network is a motion transformer.

18. The system according to claim 12, wherein the rule-based prediction model is a constant velocity model.

19. A method, comprising:

acquiring input data including road map images and historical trajectory information of a set of agents in the road map images;

transforming the input data into a vectorized representation;

generating a first candidate trajectory prediction for the set of agents by application of a motion prediction neural network on the vectorized representation;

generating a second candidate trajectory prediction for the set of agents by application of a rule-based prediction model on the acquired input data;

generating ranking results for the first candidate trajectory prediction and the second candidate trajectory prediction based on a routing function network;

selecting a trajectory for at least one agent based on the ranking results; and controlling motion of an ego agent based on the selected trajectory.

20. The method according to claim 19, wherein the ego agent is included in the set of agents.

* * * * *